United States Patent
Asanuma et al.

(10) Patent No.: US 10,886,554 B2
(45) Date of Patent: Jan. 5, 2021

(54) REDOX FLOW BATTERY PIPE, METHOD FOR MANUFACTURING REDOX FLOW BATTERY PIPE, PIPE UNIT, AND REDOX FLOW BATTERY

(71) Applicant: Sumitomo Electric Industries, Ltd., Osaka (JP)

(72) Inventors: Kentaro Asanuma, Osaka (JP); Atsuo Ikeuchi, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 86 days.

(21) Appl. No.: 16/303,704

(22) PCT Filed: Apr. 18, 2017

(86) PCT No.: PCT/JP2017/015632
§ 371 (c)(1),
(2) Date: Nov. 21, 2018

(87) PCT Pub. No.: WO2017/203899
PCT Pub. Date: Nov. 30, 2017

(65) Prior Publication Data
US 2019/0237794 A1    Aug. 1, 2019

(30) Foreign Application Priority Data
May 25, 2016 (JP) ................. 2016-104716

(51) Int. Cl.
*H01M 8/18* (2006.01)
*H01M 8/04082* (2016.01)
(Continued)

(52) U.S. Cl.
CPC ............. *H01M 8/188* (2013.01); *H01M 8/04* (2013.01); *H01M 8/04201* (2013.01);
(Continued)

(58) Field of Classification Search
CPC ..... H01M 8/188; H01M 8/04; H01M 8/04201
See application file for complete search history.

(56) References Cited

U.S. PATENT DOCUMENTS

2011/0300417 A1*  12/2011  Mou ................. H01M 8/04201
                                                        429/50
2014/0227628 A1*  8/2014  Tang ................... H01M 8/2459
                                                        429/498

FOREIGN PATENT DOCUMENTS

JP    2013-037776 A    2/2013
JP    2013-206566 A    10/2013
(Continued)

*Primary Examiner* — Jayne L Mershon
(74) *Attorney, Agent, or Firm* — Renner, Otto, Boisselle & Sklar, LLP

(57) ABSTRACT

A redox flow battery pipe which is disposed between a tank that stores an electrolyte and a battery element and through which the electrolyte flows includes a plurality of parallel portions arranged in parallel and a plurality of bent portions connecting the parallel portions adjacent to each other. The pipe includes a meandering portion in which the parallel portions and the bent portions are integrally molded so as to be alternately connected. A ratio of a center-to-center distance X to an outer diameter D satisfies 1.2 or more and 2.5 or less where D represents an outer diameter and X represents a distance between centers of the parallel portions adjacent to each other.

11 Claims, 12 Drawing Sheets

10: 10a, 10b, 10c, 10d

(51) Int. Cl.
*H01M 8/04* (2016.01)
*H01M 8/04276* (2016.01)

(52) U.S. Cl.
CPC ......... *H01M 8/04276* (2013.01); *H01M 8/18* (2013.01); *Y02E 60/50* (2013.01)

(56) References Cited

FOREIGN PATENT DOCUMENTS

| | | | |
|---|---|---|---|
| JP | 2013206566 | * | 10/2013 |
| JP | 2015-053191 A | | 3/2015 |

* cited by examiner

10:10a, 10b, 10c, 10d

FIG. 7
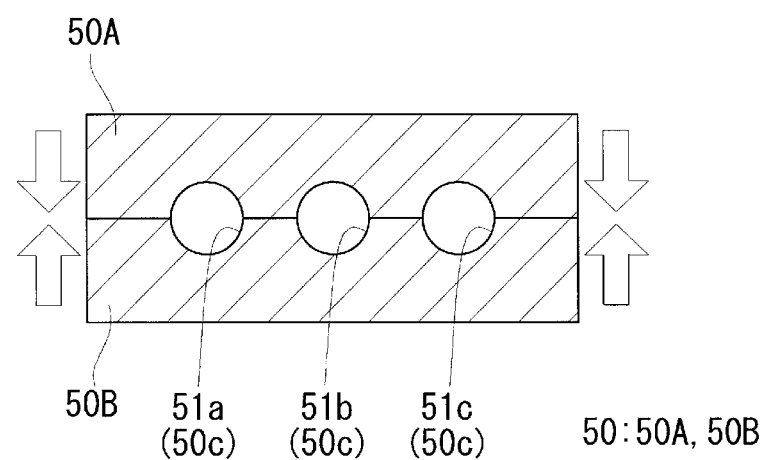
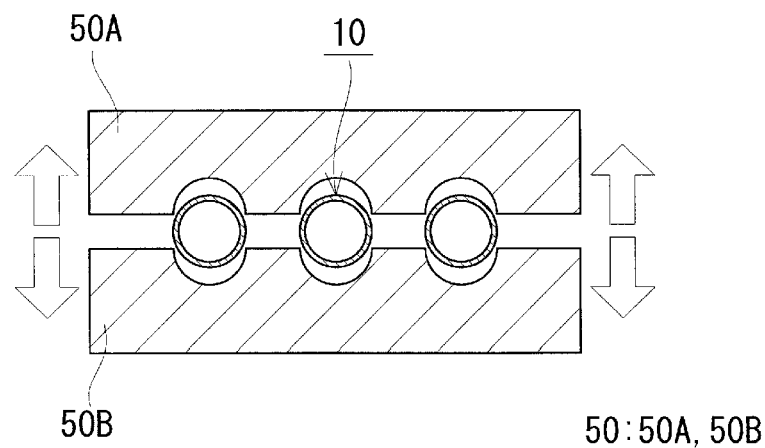

REDOX FLOW BATTERY PIPE, METHOD FOR MANUFACTURING REDOX FLOW BATTERY PIPE, PIPE UNIT, AND REDOX FLOW BATTERY

TECHNICAL FIELD

The present invention relates to a redox flow battery pipe, a method for manufacturing a redox flow battery pipe, a pipe unit, and a redox flow battery.

The present application claims priority from Japanese Patent Application No. 2016-104716 filed on May 25, 2016, and the entire contents of the Japanese patent application are incorporated herein by reference.

BACKGROUND ART

In recent years, in order to cope with global warming, introduction of power generation using natural energy (so-called renewable energy), such as solar photovoltaic power generation or wind power generation, has been promoted worldwide. The output of such power generation depends on natural conditions, such as weather. Accordingly, it is expected that when such power generation using natural energy is introduced on a large scale, problems, such as difficulties in maintaining frequencies and voltages, may occur during the operation of power systems. As a countermeasure for such problems, it is expected that large-capacity secondary batteries are installed so that, for example, smoothing of variations in output, storage of surplus power, and supply of electricity during power shortage are achieved.

One of large-capacity secondary batteries is a redox flow battery (RF battery) (refer to PTL 1). The RF battery supplies a positive electrolyte and a negative electrolyte to a battery element including a cell, which includes a positive electrode, a negative electrode, and a membrane disposed between the electrodes, so as to perform charging and discharging. Aqueous solutions containing metal ions, such as vanadium (V) ions, whose valence is changed by oxidation-reduction are used as the electrolytes. FIG. 11 is an operating principle diagram of a vanadium-based RF battery 300 in which vanadium electrolytes containing V ions are used as a positive electrolyte and a negative electrolyte. In a cell 110 illustrated in FIG. 11, the solid-line arrows indicate a charging reaction, and the dashed-line arrows indicate a discharging reaction.

The RF battery 300 includes a battery element 100. The battery element 100 includes a cell 110 including a positive electrode cell 112a that contains a positive electrode 102a therein, a negative electrode cell 112b that contains a negative electrode 102b therein, and a membrane 101 disposed between the electrode cells. The RF battery 300 includes tanks 120 (a positive electrolyte tank 120a and a negative electrolyte tank 120b) that store a positive electrolyte and a negative electrolyte, respectively, and electrolyte flow paths 130 (a positive electrolyte flow path 130a and a negative electrolyte flow path 130b) through which the electrolytes are circulated between the tanks 120 and the battery element 100 (cell 110). The electrolyte flow paths 130 include pipes 131 and 132 which are provided between the tanks 120 and the battery element 100 and through which the electrolytes flow. The tanks 120 and the battery element 100 are connected together with the pipes 131 and 132 therebetween. The pipes 131 are supply pipes through which the electrolytes are supplied from the tanks 120 to the cell 110 (the positive electrode cell 112a and the negative electrode cell 112b), and the pipes 132 are return pipes through which the electrolytes are returned from the cell 110 to the tanks 120. The electrolyte flow paths 130 (the pipes 131 in this example) are provided with pumps 140 (a positive electrolyte pump 140a and a negative electrolyte pump 140b) for pumping their corresponding electrolytes, respectively.

In general, the battery element 100 is used in the form of a cell stack in which a plurality of cells 110 each including the positive electrode 102a (positive electrode cell 112a), a negative electrode 102b (negative electrode cell 112b), and a membrane 101 disposed between the electrodes are stacked. FIG. 12 is a schematic structural view of a cell stack. Cell frames 210 each including a bipolar plate 211 and a frame body 212 provided on the outer periphery of the bipolar plate 211 so as to be integrated with each other are used in a cell stack 200. The cell stack 200 is constituted by stacking a plurality of cells 110 with the cell frames 210 therebetween, the cells 110 each including a positive electrode 102a, a membrane 101, and a negative electrode 102b that overlap, sandwiching the resulting layered body from both sides thereof using two end plates 220, and fastening the layered body. Specifically, a negative electrode (negative electrode cell) and a positive electrode (positive electrode cell) of adjacent cells 110 are disposed so as to sandwich a cell frame 210 (bipolar plate 211). Supply/drainage plates (not shown) each provided with a supply port through which an electrolyte is supplied and a drainage port through which the electrolyte is drained are disposed on the cell stack 200. The pipes 131 and 132 that form the electrolyte flow paths 130 (refer to FIG. 11) of the electrolytes are connected to the supply port and the drainage port, respectively.

CITATION LIST

Patent Literature

PTL 1: Japanese Unexamined Patent Application Publication No. 2013-206566

SUMMARY OF INVENTION

A redox flow battery pipe according to the present disclosure is a redox flow battery pipe which is disposed between a tank that stores an electrolyte and a battery element and through which the electrolyte flows, the pipe including a plurality of parallel portions arranged in parallel and a plurality of bent portions connecting the parallel portions adjacent to each other, wherein the pipe includes a meandering portion in which the parallel portions and the bent portions are integrally molded so as to be alternately connected, and a ratio of a center-to-center distance X to an outer diameter D satisfies 1.2 or more and 2.5 or less where D represents an outer diameter and X represents a distance between centers of the parallel portions adjacent to each other.

A method for manufacturing a redox flow battery pipe according to the present disclosure includes a material-feeding step of feeding a resin into a mold having a meandering cavity in which a plurality of parallel portions and a plurality of bent portions are alternately connected, a rotational molding step of subjecting the resin in the cavity to rotational molding to mold a meandering pipe in which a plurality of parallel portions and a plurality of bent portions are integrally molded so as to be alternately connected, and a removal step of removing a molded article of the pipe from the mold.

A pipe unit according to the present disclosure is a pipe unit which is disposed between a tank that stores an electrolyte and a battery element and through which the electrolyte flows, the pipe unit including a trunk pipe connected to the tank side and a plurality of branch pipes branching off from the trunk pipe and connected to the battery element side, wherein at least part of the branch pipes is the redox flow battery pipe according to the present disclosure, and the trunk pipe and the branch pipes are integrally molded.

A redox flow battery according to the present disclosure is a redox flow battery including a plurality of battery elements, a tank that stores an electrolyte, and a pipe through which the electrolyte is circulated between the tank and the battery elements, wherein the pipe includes a trunk pipe connected to the tank side and a plurality of branch pipes branching off from the trunk pipe and connected to the battery element side, and at least part of the branch pipes is the redox flow battery pipe according to the present disclosure.

BRIEF DESCRIPTION OF DRAWINGS

FIG. 7 includes schematic sectional views of a mold taken along line VII-VII in FIG. 6.

DESCRIPTION OF EMBODIMENTS

Technical Problem

Figure 1:
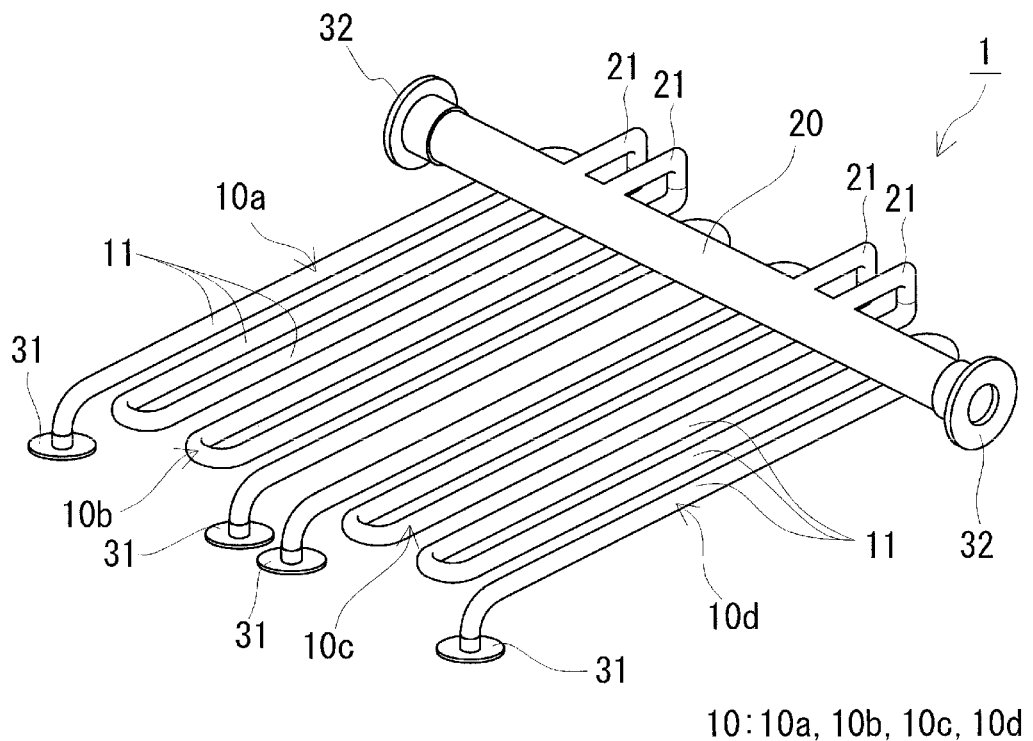
FIG. 1 is a schematic perspective view illustrating a pipe unit including a redox flow battery pipe according to an embodiment.

In general, a large-capacity RF battery includes a plurality of battery elements (a cell stack) and is configured so that a pipe through which an electrolyte flows is branched between a tank and each of the battery elements so as to transport the electrolyte between the single tank and the plurality of battery elements. In this case, a pipe (may be referred to as a "pipe unit") that includes a trunk pipe connected to the tank side and a plurality of branch pipes that branch off from the trunk pipe and are connected to the corresponding battery element side is used as the pipe that forms an electrolyte flow path of the RF battery. The pipes used in an RF battery are formed of a resin that does not react with electrolytes, typically, a polyvinyl chloride resin (PVC) because the pipes come in direct contact with the electrolytes.

When the above pipe that includes a trunk pipe and branch pipes is used for the electrolyte flow path of an RF battery, a common electrolyte flows from the trunk pipe to the battery elements through the branch pipes, and consequently, the battery elements adjacent to each other are electrically connected to each other through the electrolyte. In the RF battery, since there are manufacturing variations in the battery elements, a potential difference may be generated between adjacent battery elements. A shunt current due to this potential difference flows in the electrolyte that flows through the pipe (the trunk pipe and the branch pipes), thereby generating a loss, for example, generation of heat from the electrolyte. As a countermeasure for this, in order to increase the electrical resistance of the electrolyte flowing in the pipe, it is effective to reduce the flow path area (diameter) of each of the branch pipes connected to the battery element side and to increase the total length of the branch pipes.

Hitherto, in order to reduce the installation space of the pipe in an RF battery, a meandering (S-shaped) pipe (may be referred to as a "shunt killer pipe") in which a plurality of straight-line portions and a plurality of bent portions are alternately connected has been used as a branch pipe from the viewpoint of making the pipe compact as a whole. The term "meandering shape" refers to a shape that includes at least one meandering portion formed by three parallel portions (herein, straight-line portions) arranged in parallel and two bent portions each connecting adjacent parallel portions to each other. In this meandering pipe, on both end sides in a direction along the straight-line portions, a bent portion connecting two adjacent straight-line portions to each other and an end of the remaining one straight-line portion among the three straight-line portions are located adjacent to each other in a direction in which the straight-line portions are arranged in parallel.

In existing branch pipes, a bent portion is formed by connecting pipes to each other with a joint therebetween or by bending a pipe. In the case of using a joint, there may be a problem of an increase in the risk of liquid leakage due to, for example, defects of joint assembly or bonding defects in a portion where the joint is connected to a pipe. In addition, the use of a joint is disadvantageous in that the connection operation takes a long time. On the other hand, in the case of bending, the risk of liquid leakage can be reduced because no joint is used in the bent portion. However, since the bending is usually performed by hand work, it is difficult to stably form the bent portion with high accuracy, resulting in an increase in the cost.

Recently, there have been growing demands for a reduction in the size of a redox flow battery, and the realization of a more compact pipe has been strongly desired. In order to make a pipe compact, in a branch pipe, it is necessary to make straight-line portions closer to each other, and it is desirable to reduce the distance between the centers of straight-line portions adjacent to each other. However, reducing the distance between the centers of straight-line portions adjacent to each other (that is, reducing the radius of curvature of a bent portion) by bending is limited from the industrial viewpoint. Therefore, in practice, it is difficult to manufacture a meandering branch pipe having a small distance between the centers of straight-line portions adjacent to each other relative to the outer diameter of the pipe.

In the case where the distance between the centers of straight-line portions adjacent to each other is reduced, a bent portion connecting the two adjacent straight-line portions and an end of the remaining one straight-line portion are adjacent and close to each other. Therefore, when a bent portion is formed by bending a pipe, there may be technical problems, for example, a problem of the arrangement of a processing jig and a problem in that an end of the straight-line portion that does not subjected to bending is also heated. In view of this, hitherto, a meandering branch pipe having a small distance between the centers of straight-line portions adjacent to each other has been manufactured by preparing two pipes that are bent to have a J-shape, and connecting the J-shaped pipes to each other with a joint therebetween to form a meandering shape (S-shape). Accordingly, in the existing branch pipe, it is difficult to realize both a reduction in the risk of liquid leakage and manufacturing of a compact pipe.

Accordingly, an object of the present disclosure is to provide a redox flow battery pipe and a pipe unit having a low risk of liquid leakage and capable of being made compact in size. Another object is to provide a method for manufacturing a redox flow battery pipe, the method capable of industrially stably manufacturing, with high accuracy, a meandering pipe in which a plurality of parallel portions and a plurality of bent portions are integrally molded so as to be alternately connected. Furthermore, another object is to provide a redox flow battery in which the risk of liquid leakage of a pipe is low and an installation space of the pipe can be reduced.

Advantageous Effects of the Present Disclosure

According to the redox flow battery pipe and the pipe unit, the risk of liquid leakage is low, and the sizes of the pipe and the pipe unit can be made compact. According to the method for manufacturing a redox flow battery pipe, a meandering pipe in which a plurality of parallel portions and a plurality of bent portions are integrally molded so as to be alternately connected can be industrially stably manufactured with high accuracy. According to the redox flow battery, the risk of liquid leakage of a pipe is low, and an installation space of the pipe can be reduced.

DESCRIPTION OF EMBODIMENTS OF THE PRESENT INVENTION

The inventors of the present invention found that a meandering pipe in which a plurality of parallel portions and a plurality of bent portions are alternately connected can be integrally molded by manufacturing a redox flow battery pipe (branch pipe) by rotational molding. In rotational molding, since the molding is performed by using a mold, the restriction of the radius of curvature of the bent portions is small, and therefore, the distance between the centers of the parallel portions adjacent to each other relative to the outer diameter of the pipe can be reduced. Hereinafter, embodiments of the present invention will be listed and described.

(1) A redox flow battery pipe according to an embodiment of the present invention is a redox flow battery pipe which is disposed between a tank that stores an electrolyte and a battery element and through which the electrolyte flows, the pipe including a plurality of parallel portions arranged in parallel and a plurality of bent portions connecting the parallel portions adjacent to each other, wherein the pipe includes a meandering portion in which the parallel portions and the bent portions are integrally molded so as to be alternately connected, and a ratio of a center-to-center distance X to an outer diameter D satisfies 1.2 or more and 2.5 or less where D represents an outer diameter and X represents a distance between centers of the parallel portions adjacent to each other.

Since the redox flow battery pipe includes a meandering portion in which a plurality of parallel portions and a plurality of bent portions are integrally molded so as to be alternately connected, a long total length of the pipe can be realized to reduce a loss due to a shunt current (shunt current loss). Since the plurality of parallel portions and the plurality of bent portions are integrally molded so as to be alternately connected, the pipe is seamless and has no connecting portion with a joint or bonding. Thus, the redox flow battery pipe has a low risk of liquid leakage and high reliability.

Since the ratio (X/D) of the distance X (mm) between the centers of the parallel portions adjacent to each other to the outer diameter D (mm) is 2.5 or less, the parallel portions are close to each other, and the pipe can be made compact. Specifically, the dimension of the pipe in a width direction (a direction in which the parallel portions are arranged in parallel) can be reduced. Accordingly, the redox flow battery pipe has a low risk of liquid leakage and can be made compact. Since the ratio X/D is 1.2 or more, the parallel portions are arranged at intervals, and a gap is formed between the parallel portions. Therefore, the heat dissipation effect of the pipe is easily secured. Consequently, an increase in the temperature of the electrolyte can be suppressed.

(2) According to an embodiment of the redox flow battery pipe, the parallel portions may be straight-line portions.

The parallel portions may be, besides the straight-line portions formed to have a straight-line shape, for example, curved-line portions (curved portions) formed to have a curved-line shape or wavy-line portions formed to have a wavy-line shape. When the parallel portions are straight-line portions having a straight-line shape, the pipe can be made more compact. When the parallel portions are, for example, curved-line portions (curved portions) or wavy-line portions, the total length of the pipe can be made longer than that in the straight-line portions to further reduce the shunt current loss.

(3) According to an embodiment of the redox flow battery pipe, the pipe may have an inner peripheral surface having a surface roughness of 6.3 μm or less.

When the inner peripheral surface of the redox flow battery pipe has a surface roughness of 6.3 μm or less, the flow resistance of the electrolyte can be reduced. The term "surface roughness" used herein refers to the arithmetical mean roughness (Ra) specified in JIS B 0601:2001.

(4) According to an embodiment of the redox flow battery pipe, the pipe may have an outer diameter of 30 mm or more and 50 mm or less.

When the outer diameter of the redox flow battery pipe is 30 mm or more, the flow path area of the electrolyte is easily ensured. When the outer diameter is 50 mm or less, the pipe is easily made compact.

(5) According to an embodiment of the redox flow battery pipe, the pipe may have a thickness of 1 mm or more and 5 mm or less.

When the thickness of the redox flow battery pipe is 1 mm or more, permeation of oxygen is reduced to easily suppress entry of oxygen. Consequently, degradation of the electrolyte due to reaction with oxygen is easily suppressed, and a reduction in the battery capacity is easily suppressed. When the thickness is 5 mm or less, the flow path area is easily secured while an increase in the outer diameter is suppressed.

(6) According to an embodiment of the redox flow battery pipe, the pipe may be formed of at least one resin selected from a polyethylene resin, a polypropylene resin, and a polyvinyl chloride resin.

A polyethylene resin (PE), a polypropylene resin (PP), and a polyvinyl chloride resin (PVC) have resistance to electrolytes and do not react with the electrolytes even when any of these resins comes in direct contact with the electrolytes. When the redox flow battery pipe is formed of a thermoplastic resin such as a polyethylene resin, a polypropylene resin, or a polyvinyl chloride resin and a component such as a flange is attached to an end of the pipe, the component can be connected by thermal fusion. When the pipe and the component are thermally fused to each other, liquid leakage is unlikely to occur from the connecting portion, and high reliability is achieved. In this case, the component is also preferably formed of the same resin as the polyethylene resin, the polypropylene resin, the polyvinyl chloride resin, or the like.

(7) According to an embodiment of the redox flow battery pipe, a flange for connecting to the battery element may be integrally molded at an end to be connected to the battery element side.

When the redox flow battery pipe has a flange at an end to be connected to the battery element side, the redox flow battery pipe can be easily connected to the battery element. The flange can be attached to the end of the pipe by, for example, bonding or thermal fusion. However, when the flange is molded integrally with the end of the pipe, there is no seam between the flange and the end of the pipe. Thus, the risk of liquid leakage can be further reduced, and reliability improves. Furthermore, when the flange is integrally molded, an operation for connecting the flange to the end of the pipe is not necessary, and therefore, productivity improves.

(8) A method for manufacturing a redox flow battery pipe according to an embodiment of the present invention includes a material-feeding step of feeding a resin into a mold having a meandering cavity in which a plurality of parallel portions and a plurality of bent portions are alternately connected, a rotational molding step of subjecting the resin in the cavity to rotational molding to mold a meandering pipe in which a plurality of parallel portions and a plurality of bent portions are integrally molded so as to be alternately connected, and a removal step of removing a molded article of the pipe from the mold.

According to the manufacturing method, a meandering pipe in which a plurality of parallel portions and a plurality of bent portions are integrally molded so as to be alternately connected can be molded by rotational molding of a resin using a mold having a meandering cavity. Since this meandering pipe is an integrally molded article, is seamless, and has no connecting portion with a joint or bonding, the pipe has a low risk of liquid leakage. Accordingly, the pipe can be suitably used as a redox flow battery pipe (branch pipe). In the manufacturing method, since the meandering pipe is integrally molded by rotational molding, unlike existing methods, an operation of assembling a joint or bonding, or bending by hand work is not necessary. Thus, the pipe can be industrially stably manufactured with high accuracy to realize a reduction in the cost.

In the case of rotational molding, the distance between the centers of the parallel portions adjacent to each other can be made smaller (that is, the radius of curvature of the bent portions can be made smaller) than that in the case of bending. Therefore, a meandering pipe having a relatively small distance between the centers of the parallel portions adjacent to each other relative to the outer diameter of the pipe can be easily manufactured. For example, it is also easy to manufacture a meandering pipe in which the ratio (X/D) of the distance X (mm) between the centers of the parallel portions adjacent to each other to the outer diameter D (mm) satisfies 1.2 or more and 2.5 or less.

(9) A pipe unit according to an embodiment of the present invention is a pipe unit which is disposed between a tank that stores an electrolyte and a battery element and through which the electrolyte flows, the pipe unit including a trunk pipe connected to the tank side and a plurality of branch pipes branching off from the trunk pipe and connected to the battery element side, wherein at least part of the branch pipes is the redox flow battery pipe according to any one of (1) to (7) above, and the trunk pipe and the branch pipes are integrally molded.

In the pipe unit, at least part of the branch pipes that form a pipe through which an electrolyte is circulated is the above-described redox flow battery pipe according to an embodiment of the present invention. Therefore, the pipe unit has a low risk of liquid leakage of the pipe and high reliability. Furthermore, since the trunk pipe and the branch pipes are integrally molded, there is no seam between the trunk pipe and each of the branch pipes. Thus, the risk of liquid leakage can be further reduced, and reliability improves. In addition, since the trunk pipe and the branch pipes are integrally molded, an operation for connecting the trunk pipe to the branch pipes is not necessary, and thus productivity improves. The redox flow battery pipe described above has a small dimension in the width direction and is compact. Thus, the pipe unit that includes the redox flow battery pipe as each of the branch pipes can be made compact. Accordingly, the pipe unit has a low risk of liquid leakage and can be made compact.

The pipe unit in which the trunk pipe and the branch pipes are integrally molded can be manufactured by rotational molding. The pipe unit may be formed of, for example, at least one resin selected from a polyethylene resin, a polypropylene resin, and a polyvinyl chloride resin.

(10) A redox flow battery according to an embodiment of the present invention is a redox flow battery including a plurality of battery elements, a tank that stores an electrolyte, and a pipe through which the electrolyte is circulated between the tank and the battery elements, wherein the pipe includes a trunk pipe connected to the tank side and a plurality of branch pipes branching off from the trunk pipe and connected to the battery element side, and at least part of the branch pipes is the redox flow battery pipe according to any one of (1) to (7) above.

In the redox flow battery, at least part of the branch pipes that form a pipe through which an electrolyte is circulated is the above-described redox flow battery pipe according to an embodiment of the present invention. Therefore, the redox flow battery has a low risk of liquid leakage of the pipe and high reliability. The redox flow battery pipe has a small dimension in the width direction and is compact. Accordingly, when the redox flow battery includes the redox flow battery pipe as the branch pipes, the whole of the pipe (pipe unit) can be made compact. According to the redox flow battery, the installation space of the pipe can be reduced, and the size of the battery can be reduced.

(11) According to an embodiment of the redox flow battery, the trunk pipe and the branch pipes may be thermally fused together.

When the trunk pipe and the branch pipes are thermally fused together, liquid leakage is unlikely to occur from the portions where the trunk pipe is connected to the branch pipes, and high reliability is achieved. In this case, the trunk pipe and the branch pipes may be formed of, for example, a resin such as a polyethylene resin, a polypropylene resin, or a polyvinyl chloride resin.

(12) According to an embodiment of the redox flow battery, the trunk pipe and the branch pipes may be integrally molded.

When the trunk pipe and the branch pipes are integrally molded, there is no seam between the trunk pipe and each of the branch pipes, the risk of liquid leakage can be further reduced, and reliability improves. In this case, the trunk pipe and the branch pipes may be, for example, integrally molded by rotational molding using a resin such as a polyethylene resin, a polypropylene resin, or a polyvinyl chloride resin.

DETAILED DESCRIPTION OF EMBODIMENTS
OF THE PRESENT INVENTION

Specific examples of a redox flow battery pipe, a method for manufacturing a redox flow battery pipe, a pipe unit, and a redox flow battery according to embodiments of the present invention will be described. The same reference signs in the drawings denote the same parts. The present invention is not limited to the examples but is defined by the appended claims. The present invention is intended to cover all the modifications within the meaning and scope equivalent to those of the claims.

<RF Battery>

Figure 11:
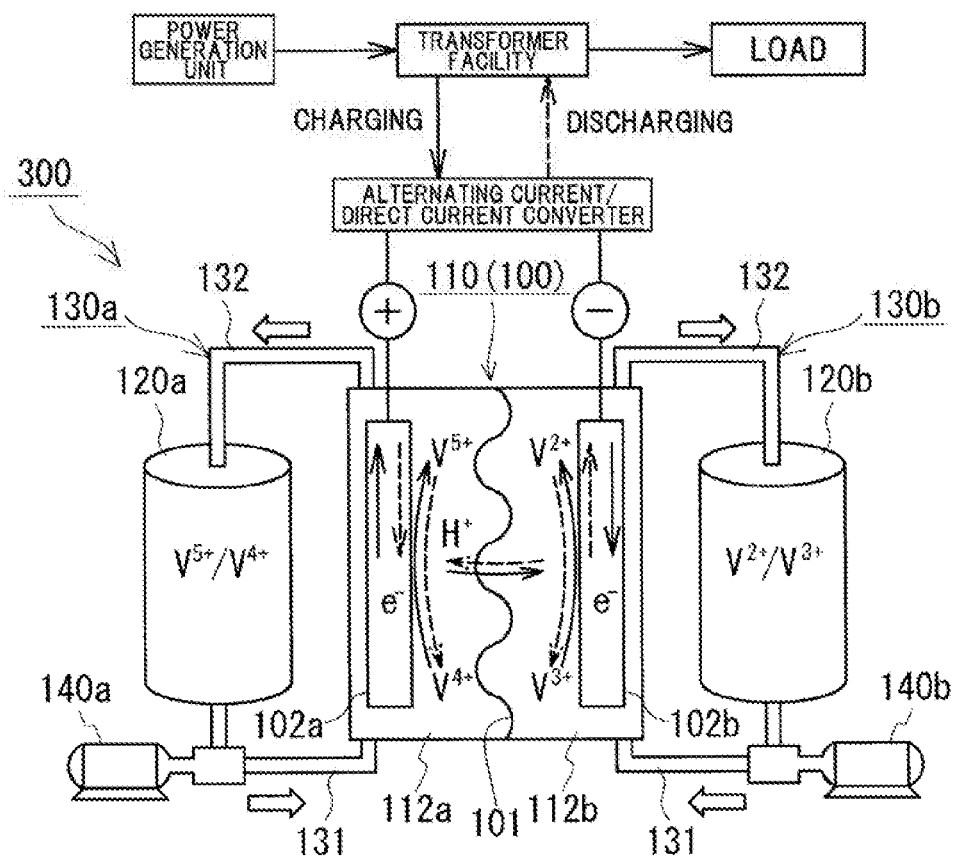
FIG. 11 is a schematic view illustrating a redox flow battery.
Figure 12:
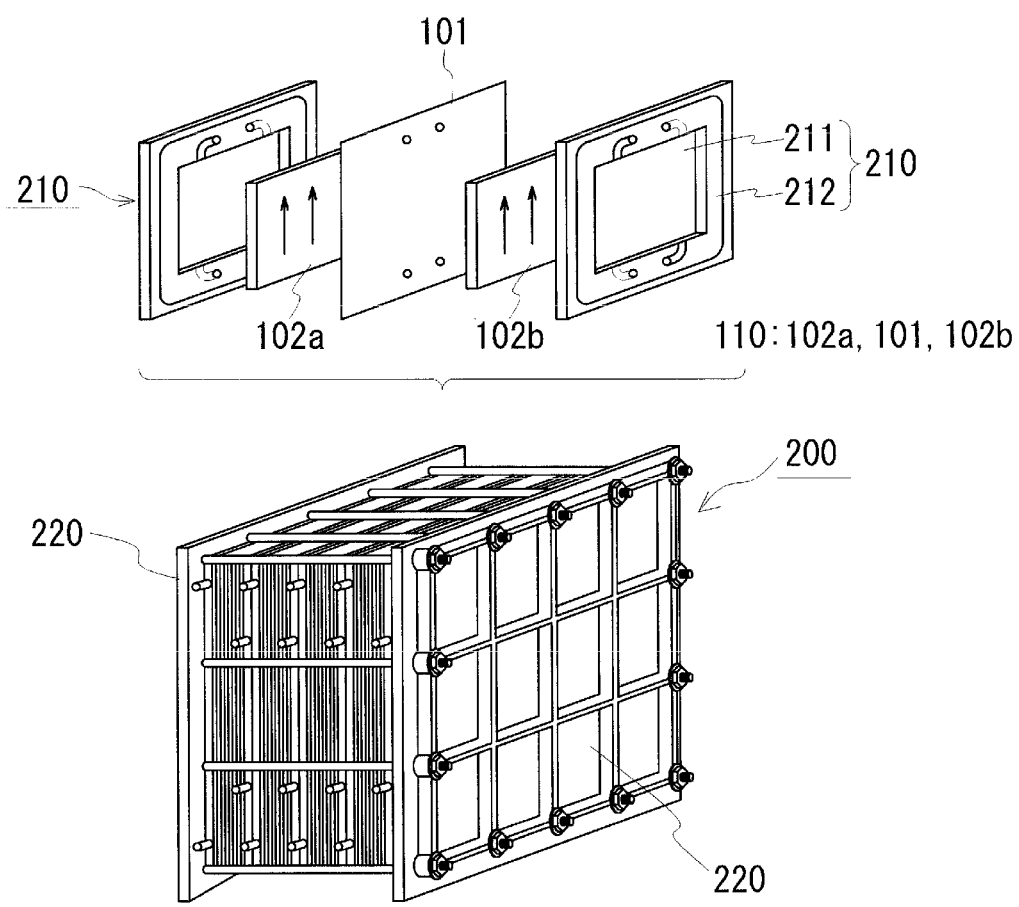
FIG. 12 is a schematic view illustrating a cell stack.

First, a description will be made of an RF battery according to an embodiment in which an RF battery pipe according to an embodiment is used. The basic configuration of the RF battery according to the embodiment is the same as that of the RF battery 300 that has been described with reference to FIG. 11 and includes battery elements 100, tanks 120 that store electrolytes, and electrolyte flow paths 130 (pipes 131 and 132) through which the electrolytes are circulated between the corresponding tank 120 and the battery elements 100. The RF battery according to the embodiment includes, as the battery elements 100, a plurality of cell stacks each obtained by stacking a plurality of cells 110. Each of the pipes 131 and 132 provided between the corresponding tank 120 and the battery elements 100 has one end that branches with respect to the individual battery elements 100 and is constituted by, for example, a pipe unit 1 including a trunk pipe 20 and a plurality of branch pipes 10 branching off from the trunk pipe 20, as illustrated in FIG. 1. The trunk pipe 20 is connected to the tank 120 side, and the branch pipes 10 are each connected to the battery element 100 side. One of features of the RF battery according to the embodiment lies in that the branch pipes 10 are each an RF battery pipe according to an embodiment described below.

<Pipe Unit>

Figure 2:
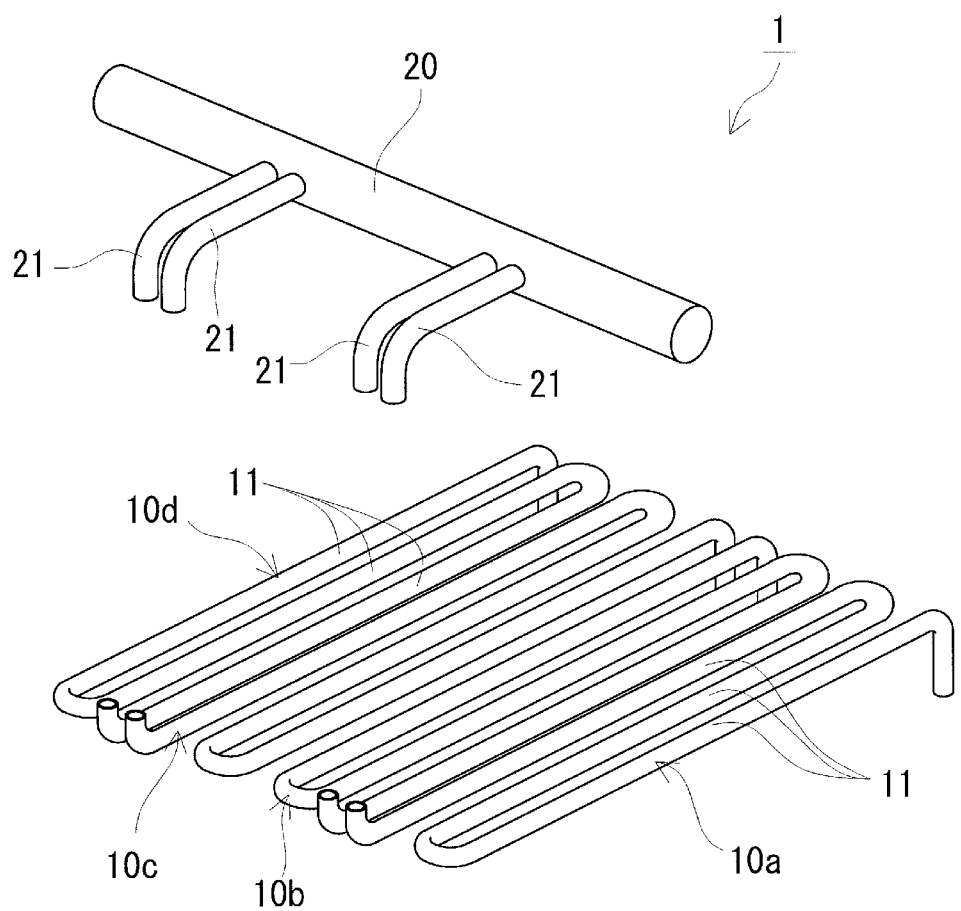
FIG. 2 is an exploded perspective view that schematically illustrates a pipe unit including a redox flow battery pipe according to an embodiment.

The pipe unit 1 according to the embodiment illustrated in FIG. 1 includes a trunk pipe 20 and four branch pipes 10a to 10d branching off from the trunk pipe 20. The branch pipes 10a to 10d are arranged in parallel in a direction orthogonal to a longitudinal direction of the trunk pipe 20. As illustrated in FIG. 2, the pipe unit 1 is constituted by connecting one end of each of the branch pipes 10a to 10d to the trunk pipe 20.

<RF Battery Pipe (Branch Pipe)>

An RF battery pipe according to an embodiment will be described with reference to FIGS. 1 to 5. Herein, an RF battery pipe according to an embodiment will be described as a branch pipe while a description will be made of, as an example, a case where the RF battery pipe according to the embodiment is applied to each of the branch pipes described above. In the description below, a direction in which branch pipes 10 are arranged (a direction in which parallel portions 11 are arranged in parallel) is defined as a width direction (left-right direction). With respect to a plane on which the branch pipes 10 (parallel portions 11) are arranged, the side on which a trunk pipe 20 is located is defined as a top, and the opposite side thereof is defined as a bottom.

Figure 3:
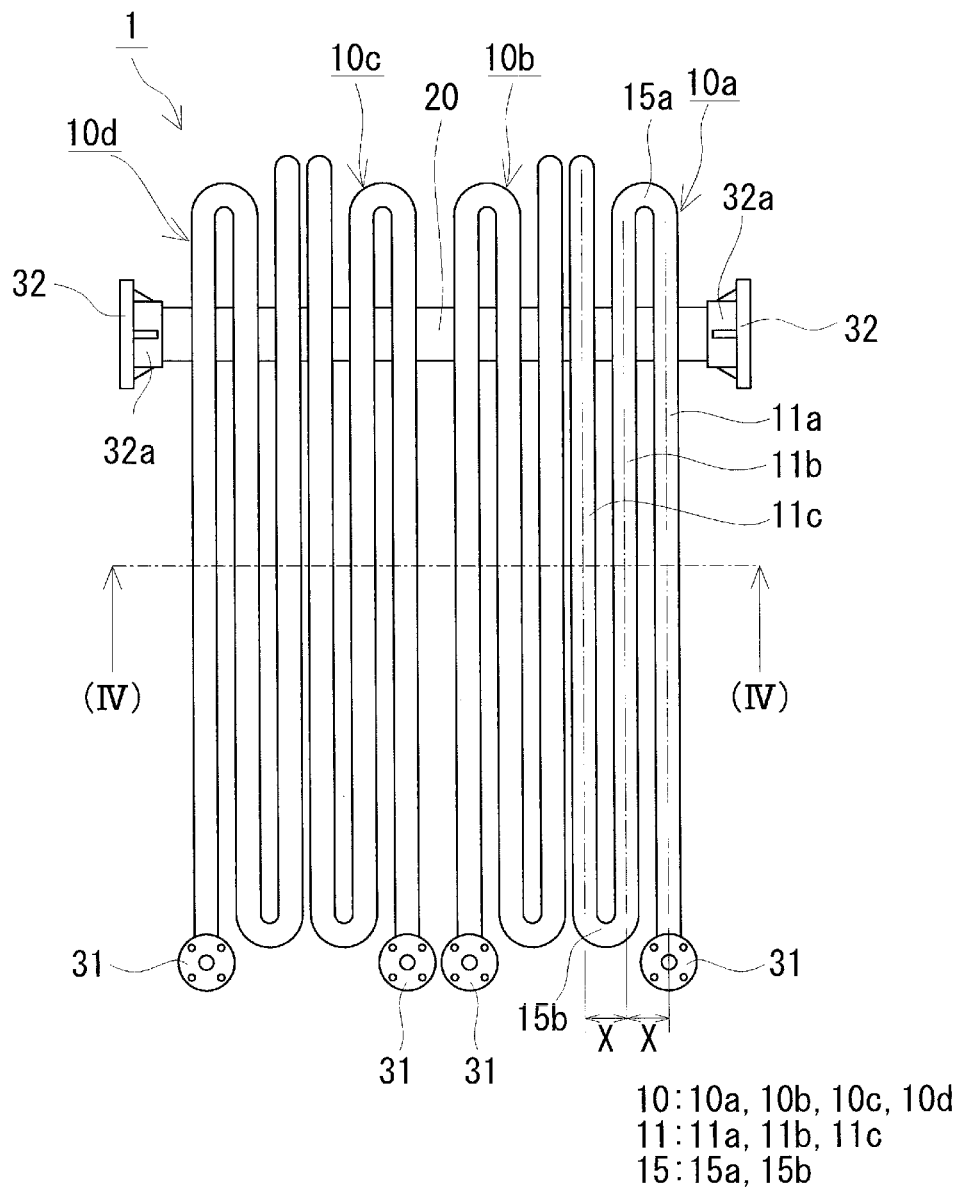
FIG. 3 is a schematic bottom view illustrating a pipe unit including a redox flow battery pipe according to an embodiment.

The branch pipes 10 each have a circular section (refer to FIG. 4), has a plurality of parallel portions 11 arranged in parallel and a plurality of bent portions 15 connecting adjacent parallel portions 11 to each other, and is formed to have a meandering shape (S-shape) as illustrated in FIG. 3. The parallel portions 11 are arranged in parallel to each other. Each of the bent portions 15 is formed to have a semi-circular arc shape (central angle: 180°). Note that the term "parallel" does not necessarily mean being parallel in a strict meaning in terms of geometry, is not limited to being exactly parallel, but covers a range that is substantially regarded as being parallel. The terms "circular shape" and "semi-circular arc shape" do not necessarily mean a circular shape and a semi-circular arc shape in a strict meaning in terms of geometry, are not limited to a perfect circular shape and a perfect semi-circular arc shape, but cover ranges that are substantially regarded as a circular shape and a semi-circular arc shape, respectively. In this embodiment, an embodiment in which the parallel portions 11 are each a straight-line portion that is linearly formed is described as an example. However, the parallel portions 11 are not limited to such straight-line portions and may be, for example, curved-line portions that are curved or wavy-line portions formed to have a wavy-line shape.

Each of the branch pipes 10 includes a meandering portion in which a plurality of parallel portions 11 and a plurality of bent portions 15 are integrally molded so as to be alternately connected. In this example, the branch pipe 10 has three linear parallel portions 11a to 11c and two bent portions 15a and 15b, and the linear parallel portions 11a to 11c and the bent portions 15a and 15b are alternately connected to form an S-shaped meandering portion. The branch pipe 10 is manufactured by rotational molding.

(Ratio of Center-to-Center Distance X to Outer Diameter D)

Figure 4:
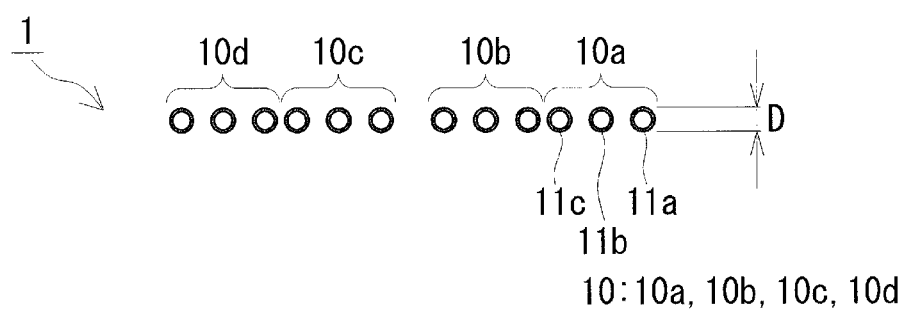
FIG. 4 is a schematic sectional view of the redox flow battery pipe taken along line IV-IV in FIG. 3.

The branch pipe 10 satisfies a ratio (X/D) of a center-to-center distance X to an outer diameter D of 1.2 or more and 2.5 or less where D (mm) represents an outer diameter of the branch pipe 10 and X (mm) represents a distance between centers of parallel portions 11 adjacent to each other (refer to FIGS. 3 and 4). The term "center-to-center distance"

refers to the maxim distance between center lines of adjacent parallel portions 11 in the direction in which the parallel portions 11 are arranged in parallel (maximum center-to-center distance). When the ratio X/D is 2.5 or less, the parallel portions 11 are close to each other, and the dimension of the branch pipe 10 in the width direction can be reduced. Since the branch pipe 10 can be made compact, the pipe unit 1 (refer to FIG. 1) including a plurality of branch pipes 10 can be made compact as a whole. When the ratio X/D is 1.2 or more, the parallel portions 11 are arranged at intervals, and a gap is formed between the parallel portions 11. Therefore, the heat dissipation effect of the branch pipes 10 is easily secured. Consequently, an increase in the temperature of an electrolyte flowing through the branch pipes 10 can be suppressed. The ratio X/D is preferably, for example, 1.5 or more and 2.0 or less.

Furthermore, the branch pipe 10 preferably satisfies any one of the following requirements.

The surface roughness of an inner peripheral surface is 6.3 μm or less.

The outer diameter is 30 mm or more and 50 mm or less.

The thickness is 1 mm or more and 5 mm or less.

(Surface Roughness of Inner Peripheral Surface)

When the branch pipe 10 has an inner peripheral surface having a surface roughness (arithmetical mean roughness Ra) of 6.3 μm or less, the flow resistance of an electrolyte can be reduced.

(Outer Diameter)

When the branch pipe 10 has an outer diameter of 30 mm or more, the flow path area of an electrolyte is easily secured. When the outer diameter is 50 mm or less, the branch pipe 10 is easily made compact. When the outer diameter is 50 mm or less, a shunt current loss due to an increase in the flow path area is easily suppressed. The outer diameter is more preferably, for example, 40 mm or less.

(Thickness)

When the branch pipe 10 has a thickness of 1 mm or more, permeation of oxygen is reduced to easily suppress entry of oxygen. Consequently, degradation of an electrolyte due to reaction with oxygen is easily suppressed, and a reduction in the battery capacity is easily suppressed. When the thickness is 5 mm or less, the flow path area is easily secured while an increase in the outer diameter is suppressed. The thickness is more preferably 3 mm or less.

(Others)

The parallel portions 11 of the branch pipe 10 each have a length of, for example, 900 mm or more and 1,500 mm or less. When the parallel portion 11 has a length of 900 mm or more, the branch pipe 10 has a long total length, and a shunt current loss is easily and effectively suppressed. When the parallel portion 11 has a length of 1,500 mm or less, the dimension of the branch pipe 10 in the direction along the parallel portion 11 can be suppressed.

(Material)

The branch pipe 10 is formed of a resin that does not react with an electrolyte because the electrolyte flow through the branch pipe 10. Examples of the resin include polyethylene resins, polypropylene resins, and polyvinyl chloride resins. Among these, polyethylene resins or polypropylene resins are preferable from the viewpoint of, for example, resistance to electrolytes, moldability, and mechanical strength. In this example, the branch pipe 10 is formed of a polyethylene resin (PE).

(Flange)

Figure 5:
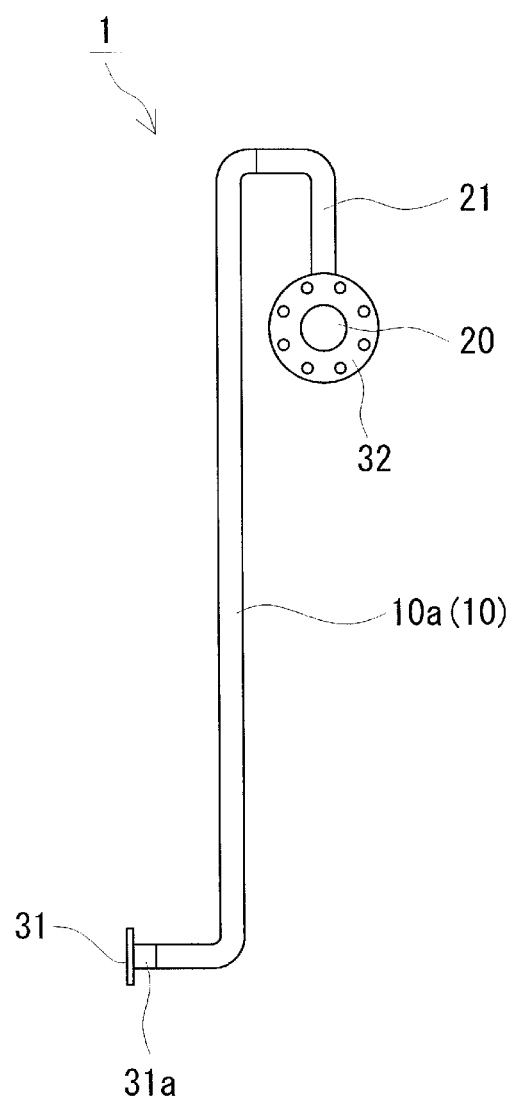
FIG. 5 is a schematic side view of the pipe unit illustrated in FIG. 3.

In this example, the other end of the branch pipe 10 (end on the side opposite to the side to which the trunk pipe 20 is connected) is bent downward (refer to FIGS. 1 and 5) in the assembles state of the pipe unit 1. As illustrated in FIG. 1, the branch pipes 10a to 10d have, on the other ends thereof, flanges 31 for connecting to supply ports and drainage ports (not shown) of battery elements. As illustrated in FIG. 5, each of the flanges 31 has a cylindrical portion 31a into which the other end of the branch pipe 10 is inserted. The flange 31 illustrated in this example is thermally fused to the other end of the branch pipe 10 in a state in which the other end of the branch pipe 10 is inserted into the cylindrical portion 31a. The flange 31 can be formed by using the same resin (for example, a polyethylene resin or a polypropylene resin) as that used for the branch pipe 10. In this example, the flange 31 is formed of the same polyethylene resin as that used for the branch pipe 10. In this example, the flange 31 is formed as a separate component from the branch pipe 10 and attached to the end of the branch pipe 10 by thermal fusion. However, the flange 31 is not limited thereto. For example, the flange 31 may be integrally molded at the end of the branch pipe 10 by rotational molding. When the flange 31 is integrally molded, there is no seam between the flange 31 and the end of the branch pipe 10. Accordingly, the risk of liquid leakage can be further reduced, and reliability improves.

(Trunk Pipe)

The trunk pipe 20 is a linear pipe having a circular section (refer to FIGS. 3 and 5). The trunk pipe 20 is formed of a resin, similarly to the branch pipes 10, and formed by using the resin described above (for example, a polyethylene resin or a polypropylene resin). As illustrated in FIG. 2, a plurality of branch connecting portions 21 to which the one-ends of the branch pipes 10a to 10d are connected are integrally molded on the peripheral surface of the trunk pipe 20. The branch connecting portions 21 project from the peripheral surface of the trunk pipe 20 and arranged in the longitudinal direction of the trunk pipe 20. In this example, the one end of each of the branch pipes 10 is bent upward (refer to FIGS. 2 and 5). The one-ends of the branch pipes 10a to 10d and ends of the branch connecting portions 21 of the trunk pipe 20 are disposed so as to face each other and thermally fused together in this state. Consequently, the branch pipes 10 are connected to the trunk pipe 20 to form the pipe unit 1 illustrated in FIG. 1. In this example, the trunk pipe 20 is formed of the same polyethylene resin as that used for the branch pipes 10, and the trunk pipe 20 is manufactured by rotational molding. The surface roughness of the inner peripheral surface of the trunk pipe 20 and the thickness of the trunk pipe 20 are preferably the same as those of the branch pipes 10. Specifically, the trunk pipe 20 may have an inner peripheral surface having a surface roughness (arithmetical mean roughness Ra) of 6.3 μm or less and have a thickness of 1 mm or more and 5 mm or less, preferably 3 mm or less.

(Flange)

As illustrated in FIGS. 1 and 3, the trunk pipe 20 has, on each end thereof, a flange 32 for connecting to another trunk pipe. As illustrated in FIG. 3, the flange 32 has a cylindrical portion 32a into which an end of the trunk pipe 20 is inserted. The flange 32 illustrated in this example is thermally fused to an end of the trunk pipe 20 in a state in which the end of the trunk pipe 20 is inserted into the cylindrical portion 32a. The flange 32 can be formed by using the same resin (for example, a polyethylene resin or a polypropylene resin) as that used for the trunk pipe 20. In this example, the flange 32 is formed of the same polyethylene resin as that used for the trunk pipe 20. In this example, the flange 32 is formed as a separate component from the trunk pipe 20 and attached to each end of the trunk pipe 20 by thermal fusion.

However, the flange 32 is not limited thereto. For example, the flange 32 may be integrally molded at the end of the trunk pipe 20 by rotational molding. When the flange 32 is integrally molded, there is no seam between the flange 32 and the end of the trunk pipe 20. Accordingly, the risk of liquid leakage can be further reduced, and reliability improves.

Advantageous Effects

The redox flow battery pipe (branch pipe 10) according to the above embodiment has the following advantageous effects.

(1) As illustrated in FIG. 3, since the pipe includes a meandering portion in which a plurality of parallel portions 11 and a plurality of bent portions 15 are integrally molded so as to be alternately connected, a long total length of the pipe can be realized to reduce a shunt current loss.

(2) Since the plurality of parallel portions 11 and the plurality of bent portions 15 are integrally molded so as to be alternately connected, the pipe is seamless and has a low risk of liquid leakage.

(3) Since the ratio (X/D) of the distance X between the centers of the parallel portions 11 adjacent to each other to the outer diameter D is 2.5 or less, the dimension of the pipe in the width direction can be reduced, and the pipe can be made compact. Since the ratio X/D is 1.2 or more, the parallel portions 11 are arranged at intervals, the heat dissipation effect of the pipe can be secured, and an increase in the temperature of an electrolyte can be suppressed.

Use

The redox flow battery pipe according to the above embodiment can be suitably used as a shunt killer pipe of a redox flow battery.

The pipe unit 1 according to the above embodiment has the following advantageous effects.

(1) Since the branch pipes 10 are each the redox flow battery pipe according to the above embodiment, the pipe unit 1 has a low risk of liquid leakage and can be made compact.

(2) Since the trunk pipe 20 and the branch pipes 10 are thermally fused together, liquid leakage is unlikely to occur from portions where the trunk pipe 20 is connected to the branch pipes 10, and the pipe unit 1 is highly reliable.

The redox flow battery according to the above embodiment has the following advantageous effects.

(1) Since the branch pipes 10 that form the pipe (pipe unit 1) through which an electrolyte is circulated are each the redox flow battery pipe according to the above embodiment, the risk of liquid leakage of the pipe is low, and high reliability is achieved. Since the branch pipes 10 each have a small dimension in the width direction and are compact, the pipe unit 1 can be made compact as a whole. Accordingly, the installation space of the pipe can be reduced, and the size of the RF battery can be reduced.

(2) Since the trunk pipe 20 and the branch pipes 10 that form the pipe unit 1 are thermally fused together, liquid leakage is unlikely to occur from portions where the trunk pipe 20 is connected to the branch pipes 10.

<Method for Manufacturing RF Battery Pipe (Branch Pipe)>

A method for manufacturing an RF battery pipe (branch pipe) according to an embodiment will be described with reference to FIGS. 6 and 7. A branch pipe 10 (refer to FIG. 3) can be manufactured by a method for manufacturing a RF battery pipe according to an embodiment, the method including a material-feeding step, a rotational molding step, and a removal step. Hereinafter, the steps in the method for manufacturing an RF battery pipe will be described in detail.

(Material-Feeding Step)

Figure 6:
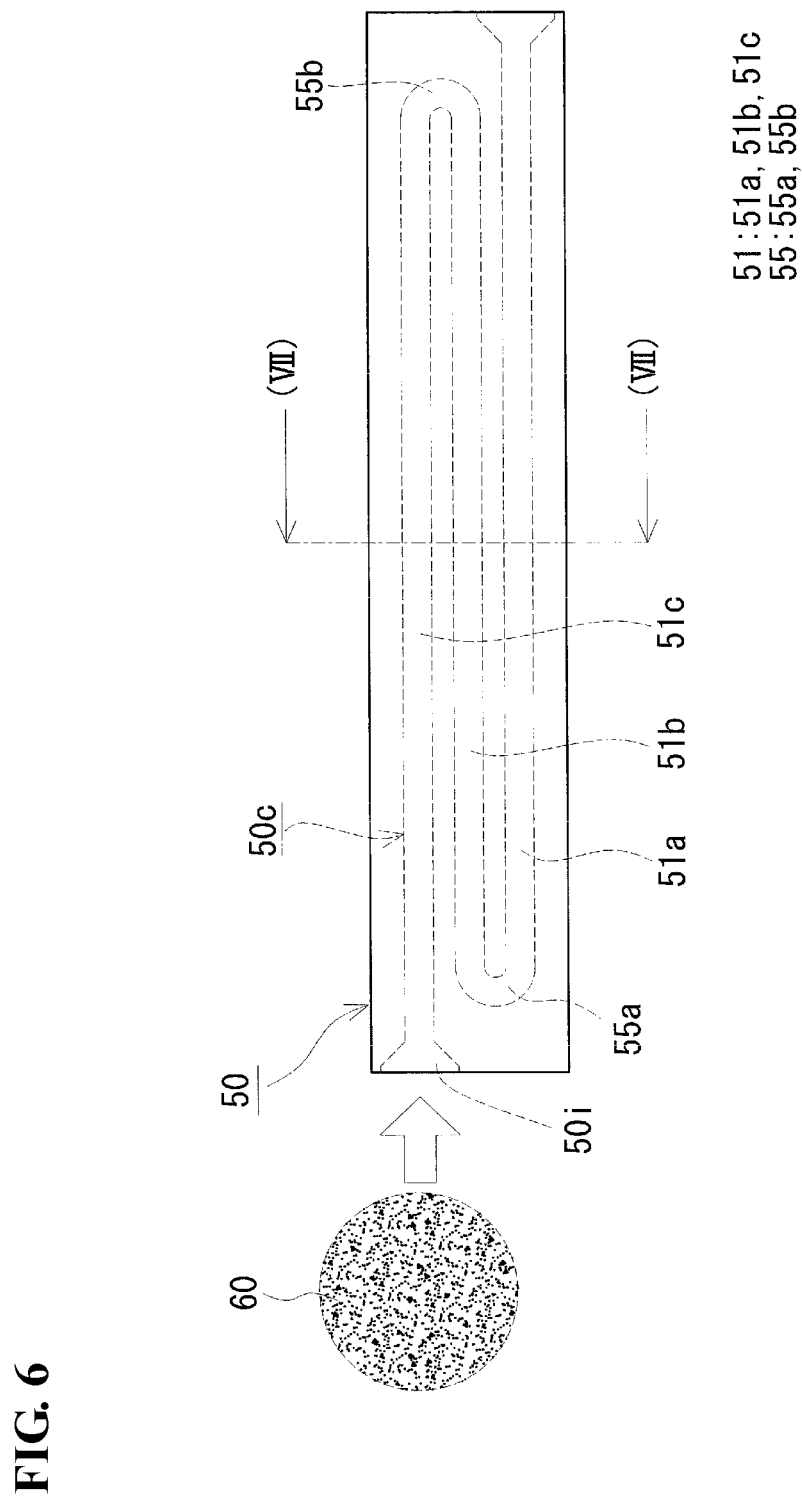
FIG. 6 is a schematic plan view illustrating a material-feeding step in a method for manufacturing a redox flow battery pipe according to an embodiment.

The material-feeding step is a step of feeding a resin 60 into a mold 50, as illustrated in FIG. 6. A meandering cavity 50c in which a plurality of parallel portions 51 and a plurality of bent portions 55 are alternately connected is formed in the mold 50. In this example, the cavity 50c is formed to have a meandering shape (S-shape) so as to correspond to the shape of the branch pipe 10 (refer to FIG. 3). Specifically, the cavity 50c is a hole having a circular section (refer to the upper drawing of FIG. 7) and has three linear parallel portions 51a to 51c arranged in parallel and two bent portions 55a and 55b connecting adjacent parallel portions 51 to each other in plan view, as illustrated in FIG. 6. The cavity 50c is formed in a continuous, meandering manner such that the parallel portions 51a to 51c and the bent portions 55a and 55b are alternately connected. The mold 50 has a resin feed port 50i that communicates with the cavity 50c. The resin 60 used as the material is a powdery resin and is a polyethylene resin in this example.

As illustrated in the upper drawing of FIG. 7, the mold 50 has a halved structure including an upper mold 50A and a lower mold 50B and can be opened and closed in the up-down direction. On each of the facing surfaces of the upper mold 50A and the lower mold 50B, a groove having a semi-circular section that forms the cavity 50c is formed in a meandering manner. The mold 50 is configured so that the cavity 50c is formed by closing the upper mold 50A and the lower mold 50B downward and upward, respectively.

In the case where a flange 31 (refer to FIG. 3) is integrally molded at an end of the branch pipe 10, the mold 50 is configured so as to form a cavity 50c having a flange-shaped recess (not shown) corresponding to the shape of the flange 31 at an end position of a parallel portion 51 on which the flange 31 is to be formed.

(Rotational Molding Step)

In the rotational molding step, the resin 60 in the cavity 50c is subjected to rotational molding to form a meandering pipe in which a plurality of parallel portions and a plurality of bent portions are integrally molded so as to be alternately connected. In the rotational molding, the molding is performed by rotating the mold 50 (refer to FIG. 6) while heating so that the resin 60 in the cavity 50c is melted and adheres to a wall surface of the cavity 50c, and subsequently cooling the mold 50 while rotating so as to cover the wall surface of the cavity 50c with the resin 60.

The rotational molding is preferably performed under conditions of biaxial rotation in which the mold is subjected to a planetary motion by a biaxial motion. The heating method is preferably a medium circulation method in which heating is performed by directly circulating a heat medium through the mold. The rotational speed during the rotational molding is appropriately determined. In the case of the biaxial rotation, for example, both a primary axis and a secondary axis are rotated at a rotational speed of 1 rpm or more and 100 rpm or less. A known rotational molding machine can be used in the rotational molding.

(Removal Step)

The removal step is a step of removing the resulting molded article of the pipe from the mold 50. Specifically, as illustrated in the lower drawing of FIG. 7, the upper mold 50A and the lower mold 50B are opened upward and downward, respectively, and the branch pipe 10 is removed.

Advantageous Effects

The method for manufacturing a redox flow battery pipe according to the above embodiment has the following advantageous effects.

(1) As illustrated in FIG. 6, the resin 60 is subjected to rotational molding using the mold 50 having the meandering cavity 50c, thereby molding a meandering pipe in which a plurality of parallel portions and a plurality of bent portions are integrally molded so as to be alternately connected. The pipe manufactured by rotational molding is seamless, and therefore has a low risk of liquid leakage. The manufactured pipe can be used as a redox flow battery pipe and suitably used as, for example, the branch pipe 10 that forms the pipe unit 1 illustrated in FIG. 1.

(2) Since a meandering pipe is integrally molded by rotational molding, unlike existing methods, an operation of assembling or bonding a joint or bending by hand work is not necessary. Thus, the pipe can be industrially stably manufactured with high accuracy to realize a reduction in the cost.

In addition, the molding of a pipe by rotational molding achieves the following advantages.

In rotational molding, since the molding is performed by using a mold, the radius of curvature of the bent portion can be made smaller than that in the case where a bent portion is formed by bending. Therefore, a meandering pipe having a relatively small distance between the centers of the parallel portions adjacent to each other relative to the outer diameter of the pipe can be easily manufactured. For example, it is also easy to manufacture a meandering pipe in which the ratio (X/D) of the distance X between the centers of the parallel portions adjacent to each other to the outer diameter D satisfies 1.2 or more and 2.5 or less.

The inventors of the present invention manufactured a meandering pipe on an experimental basis by bending a pipe to form a bent portion. According to the results, it was difficult to form a bent portion by bending so as to satisfy a ratio X/D of 2.5 or less. For example, buckling occurred, and such a pipe could not be stably formed with high accuracy.

In rotational molding, molding is performed by causing a molten resin to adhere to a wall surface of a cavity, and gradually forming a layer of the resin. Accordingly, internal stress is unlikely to remain compared with another molding method such as injection molding. Furthermore, since no pressure is applied during molding, residual stress is small. Therefore, a high impact resistance is obtained, and stress cracking is unlikely to occur.

Injection molding is typically employed for molding a resin, and a core is used when a pipe is molded. In injection molding, since the inner peripheral surface of the pipe comes in contact with the core during injection molding, surface properties of the inner peripheral surface of the pipe may be degraded by contact with the core. In contrast, in rotational molding, a layer of a resin is gradually formed on a wall surface of a cavity as described above, and therefore, the inner peripheral surface of the pipe is a free surface during rotational molding. Accordingly, a smooth inner peripheral surface is easily obtained, and the surface roughness Ra of the inner peripheral surface of the pipe can be 6.3 μm or less. When the inner peripheral surface of the pipe has a surface roughness of 6.3 μm or less, the flow resistance of an electrolyte flowing through the pipe can be expected to be reduced.

Furthermore, when a bent portion is formed by bending a pipe, a sectional shape may become flat in the bent portion, and the sectional shape of the bent portion may be deformed. For example, when a pipe having a circular section is bent, it is difficult to maintain the sectional shape of the bent portion to be a circular shape. Consequently, the circularity may differ between the parallel portion and the bent portion. On the other hand, when a pipe is molded by rotational molding, deformation of the sectional shape of the bent portion does not occur. Accordingly, the same sectional shape can be maintained from the parallel portion to the bent portion, and the circularity is maintained in the parallel portion and the bent portion. Thus, the flow resistance of an electrolyte can be expected to be reduced.

In the pipe unit 1 according to the embodiment described with reference to FIGS. 1 to 5, an embodiment has been described as an example in which the trunk pipe 20 and the branch pipes 10 are separately formed and connected together by thermal fusion. However, the pipe unit 1 is not limited thereto. In another embodiment, a trunk pipe 20 may be molded integrally with branch pipes 10. Hereinafter, an example of a pipe unit 1A according to another embodiment will be described with reference to FIGS. 8 to 10. In the description below, components the same as those of the pipe unit 1 according to the above embodiment are assigned the same reference signs, and descriptions thereof are omitted. The difference will be mainly described.

Figure 8:
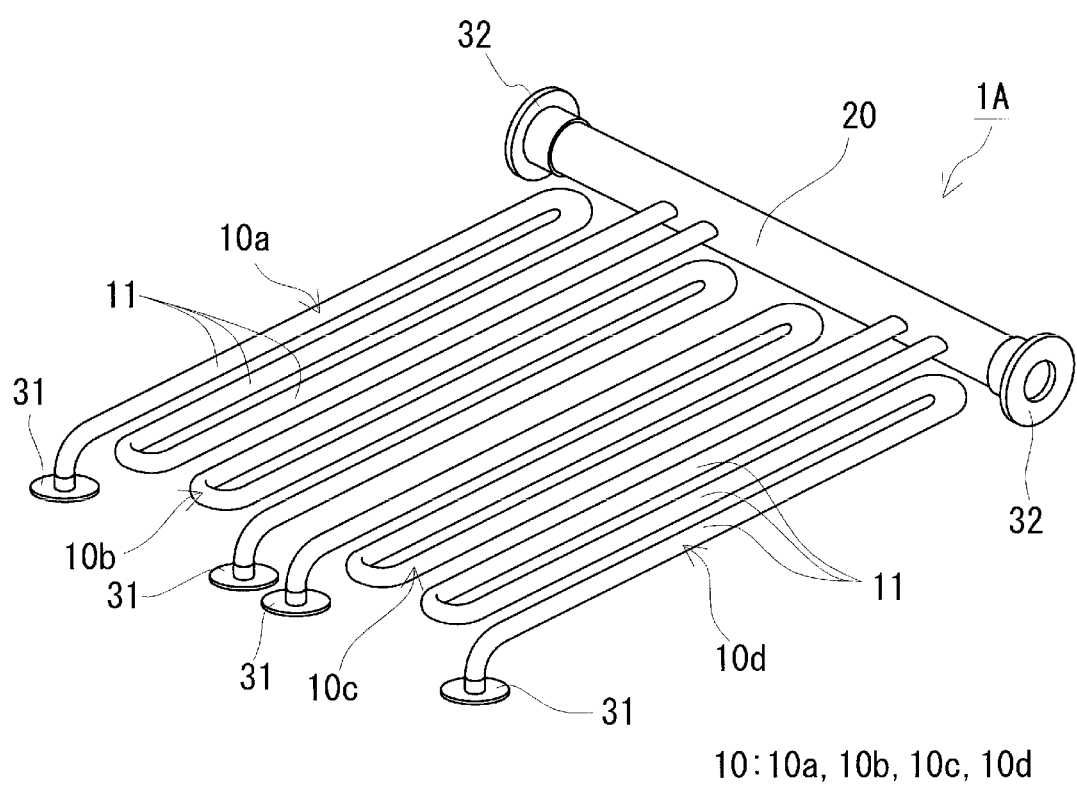
FIG. 8 is a schematic perspective view illustrating a pipe unit according to another embodiment.
Figure 9:
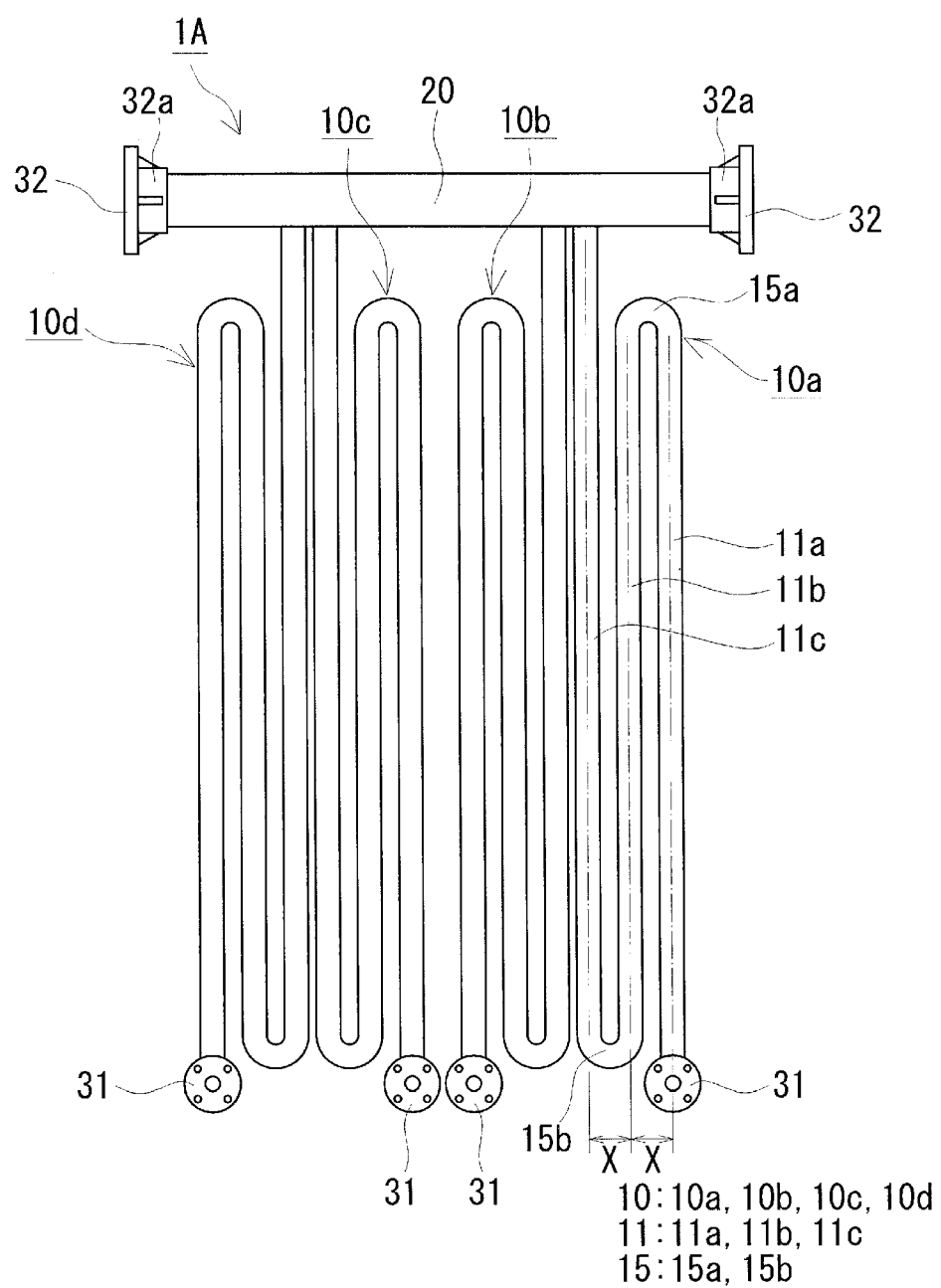
FIG. 9 is a schematic bottom view illustrating a pipe unit according to another embodiment.
Figure 10:
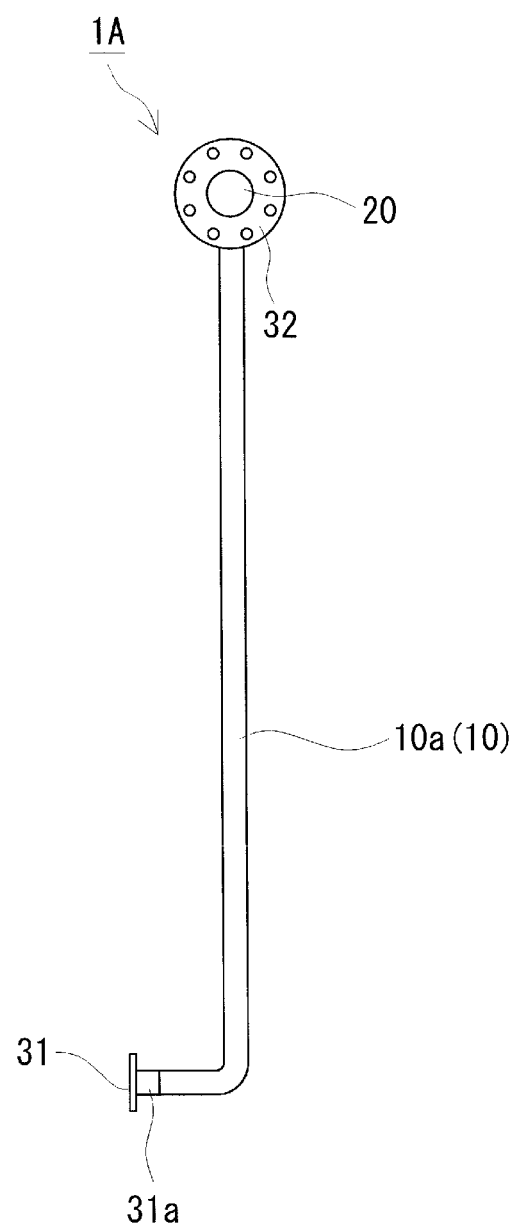
FIG. 10 is a schematic side view of the pipe unit illustrated in FIG. 9.

As illustrated in FIG. 8, a pipe unit 1A includes a trunk pipe 20 and a plurality of branch pipes 10 branching off from the trunk pipe 20. In the pipe unit 1A illustrated in FIG. 8, four branch pipes 10a to 10d branch off from the trunk pipe 20, and one end of each of the branch pipes 10a to 10d is connected to the trunk pipe 20. In this example, as illustrated in FIGS. 9 and 10, the trunk pipe 20 is located in a direction along parallel portions 11 of the branch pipes 10, and the branch pipes 10 (parallel portions 11) and the trunk pipe 20 are disposed on the same plane so as not to overlap with each other in plan view.

In the pipe unit 1A, the trunk pipe 20 and the branch pipes 10 are integrally molded. The pipe unit 1A is manufactured by, for example, integrally molding the trunk pipe 20 and the branch pipes 10 by rotational molding using, as a material, a resin such as a polyethylene resin, a polypropylene resin, or a polyvinyl chloride resin. A mold used in this case has a cavity for integrally molding the trunk pipe 20 and the branch pipes 10. In the pipe unit 1A, a flange 31 may be integrally molded at an end of each of the branch pipes 10, and a flange 32 may be integrally molded at an end of the trunk pipe 20, as described in the above embodiment.

In the pipe unit 1A according to the other embodiment, since the trunk pipe 20 and the branch pipes 10 are integrally molded, there is no seam between the trunk pipe 20 and each of the branch pipes 10. Thus, the risk of liquid leakage can be further reduced, and reliability improves. In addition, since the trunk pipe and the branch pipes are integrally molded, an operation for connecting the trunk pipe to the branch pipes is not necessary, and therefore, productivity improves. When the pipe unit 1A is applied to a pipe through which an electrolyte is circulated and which is included in the redox flow battery according to the above embodiment, the risk of liquid leakage of the pipe can be further reduced, and reliability can be further enhanced.

The invention claimed is:

1. A redox flow battery pipe which is disposed between a tank that stores an electrolyte and a battery element and through which the electrolyte flows, the pipe comprising:

a plurality of parallel portions arranged in parallel and a plurality of bent portions connecting the parallel portions adjacent to each other, wherein the pipe includes a meandering portion in which the parallel portions and the bent portions are integrally molded so as to be alternately connected, a sectional circularity of the parallel portions being maintained in the bent portions, and a ratio of a center-to-center distance X to an outer diameter D satisfies 1.2 or more and 2.5 or less where D represents an outer diameter and X represents a distance between centers of the parallel portions adjacent to each other.

2. The redox flow battery pipe according to claim 1, wherein the parallel portions are straight-line portions.

3. The redox flow battery pipe according to claim 1, wherein the pipe has an inner peripheral surface having a surface roughness of 6.3 µm or less.

4. The redox flow battery pipe according to claim 1, wherein the pipe has an outer diameter of 30 mm or more and 50 mm or less.

5. The redox flow battery pipe according to claim 1, wherein the pipe has a thickness of 1 mm or more and 5 mm or less.

6. The redox flow battery pipe according to claim 1, wherein the pipe is formed of at least one selected from a polyethylene resin, a polypropylene resin, and a polyvinyl chloride resin.

7. The redox flow battery pipe according to claim 1, wherein a flange for connecting to the battery element is integrally molded at an end to be connected to the battery element side.

8. A pipe unit which is disposed between a tank that stores an electrolyte and a battery element and through which the electrolyte flows, the pipe unit comprising:

a trunk pipe connected to the tank side and a plurality of branch pipes branching off from the trunk pipe and connected to the battery element side, wherein at least part of the branch pipes is the redox flow battery pipe according to claim 1, and the trunk pipe and the branch pipes are integrally molded.

9. A redox flow battery comprising a plurality of battery elements, a tank that stores an electrolyte, and a pipe through which the electrolyte is circulated between the tank and the battery elements, wherein the pipe includes a trunk pipe connected to the tank side and a plurality of branch pipes branching off from the trunk pipe and connected to the battery element side, and at least part of the branch pipes is the redox flow battery pipe according to claim 1.

10. The redox flow battery according to claim 9, wherein the trunk pipe and the branch pipes are thermally fused together.

11. The redox flow battery according to claim 9, wherein the trunk pipe and the branch pipes are integrally molded.

* * * * *